United States Patent [19]

Buckley

[11] Patent Number: 4,906,422
[45] Date of Patent: Mar. 6, 1990

[54] METHOD OF PRODUCING MOULDS FOR ORGANIC POLYMER MULTIFOCAL LENSES

[75] Inventor: Milford L. Buckley, Horseheads, N.Y.

[73] Assignee: Corning Incorporated, Corning, N.Y.

[21] Appl. No.: 424,914

[22] Filed: Oct. 23, 1989

Related U.S. Application Data

[63] Continuation-in-part of Ser. No. 258,904, Oct. 17, 1988, abandoned.

[51] Int. Cl.⁴ .............................................. B29D 11/00
[52] U.S. Cl. .................................... 264/2.5; 65/37; 264/219; 264/222; 425/808
[58] Field of Search ................ 264/1.1, 2.5, 219, 222; 425/808; 65/37-39, 42

[56] References Cited

U.S. PATENT DOCUMENTS

| | | | |
|---|---|---|---|
| 2,035,827 | 3/1936 | Newell | 65/38 |
| 2,059,767 | 11/1936 | Bausch | 65/39 |
| 2,112,659 | 3/1939 | Reh | 65/38 |
| 2,388,687 | 11/1945 | Hammon | 65/38 |
| 2,704,010 | 3/1955 | Lantz et al. | 65/37 X |
| 3,563,057 | 2/1971 | Rosenbauer | 65/37 X |
| 3,649,236 | 3/1972 | Rosenbauer | 264/2.5 X |
| 4,155,962 | 5/1979 | Neefe | 425/808 X |
| 4,163,541 | 8/1979 | Campbell | 425/808 X |
| 4,260,405 | 4/1981 | Ambrogi | 65/42 |
| 4,562,018 | 12/1985 | Neefe | 425/808 |
| 4,842,632 | 6/1989 | Buckley | 65/38 |

Primary Examiner—Robert L. Lindsay
Attorney, Agent, or Firm—Clinton S. Janes, Jr.; Milton M. Peterson

[57] ABSTRACT

A method is disclosed for constructing a glass mould, and particularly the primary glass mould member, for use in casting multifocal, ophthalmic lenses from organic polymers. The method comprises pressing a glass segment with a cavity, removing the base portion of the segment to form a perforation, mounting the perforated segment on a second glass body, and fusing the assembly to form a blank for finishing. For trifocal lenses, a composite, perforated segment is formed and sealed in a depression on a major element to form a blank.

4 Claims, 3 Drawing Sheets

METHOD OF PRODUCING MOULDS FOR ORGANIC POLYMER MULTIFOCAL LENSES

This application is a Continuation-In-Part application of Ser. No. 258,904 filed Oct. 17, 1988 abandoned.

FIELD OF THE INVENTION

This invention is concerned with moulding ophthalmic, multifocal lenses composed of an organic polymer. It is particularly concerned with an improved method of producing a contoured surface on a primary glass mould member for such purpose.

BACKGROUND OF THE INVENTION

Traditionally, multifocal lenses have been produced in glass by fusing a small glass segment, or button, member of high lens power into a countersink on a larger lens blank, commonly referred to as the "major". This practice is described in detail in my U.S. Pat. No. 4,842,632.

It is not practical to employ this procedure in producing organic polymer, multifocal lenses. Hence, such lenses are moulded in a one-piece construction of a single material. One surface may be a smooth continuous surface having a single curvature. The other surface, usually, but not necessarily, the front surface, must be contoured to provide the required corrective curvatures. In a bifocal lens, these are the near and far vision corrections. Necessarily, the corrective curvatures have different radii of curvature. Hence, they are separated by a narrow wall extending between an edge on one surface of corrective curvature and the second corrective surface of curvature.

Currently, organic lenses are produced by filling a cavity with a liquid monomer containing known polymerizing additives. The cavity may be formed by an assembly of two glass mould members held in spaced relationship by a flexible gasket.

The surface contours of the two mould members will be precisely the reverse of the surface contours desired on the organic lens. As a result, the prescription power and surface finish quality of an organic multifocal lens relies entirely on the finished accuracy of the glass mould members against which the lens is formed.

The primary glass mould member, against which the corrective front surface of an organic multifocal lens is formed, is a precision fused assembly contoured to provide the different curvatures required. As described in detail later, one of the fused members in this assembly has, heretofore, been ground and polished, before fusion and finishing, to provide an angular wall in the fused assembly. This has been necessary to permit opening of a glass mould to remove a moulded organic lens without damage to the lens. Customarily, the glass mould members are of an ophthalmic quality, white crown glass, e.g. an alkali-lime-silicate, or alkali-zinc-silicate composition.

Production of the glass mould members is a very specialized, and hence expensive, operation that requires frequent inspections and measurements to achieve the necessary accuracy. Moreover, the polished glass mould members are very prone to damage. Therefore mould life is quite unpredictable, and may vary from one or two castings to as many as a hundred. Hence, constant checking of mould surfaces is a necessity, as is maintaining a substantial inventory of mould members for replacement.

PURPOSE OF THE INVENTION

A purpose of the invention is to provide a novel and unique method of constructing a glass mould for use in producing organic polymer, multifocal lenses.

Another purpose is to provide a simpler and less expensive method of constructing a glass mould for producing organic polymer, multifocal lenses.

A further purpose is to provide an improved method for constructing the primary mould member in a glass mould for producing organic polymer, multifocal lenses.

Still another purpose is to avoid having a ground and polished, exposed surface in a fused glass mould blank.

A particular purpose is to provide a glass mould which may be opened to remove a moulded organic multifocal lens without damage to the lens.

SUMMARY OF THE INVENTION

My invention resides in a method of forming a contoured surface on a primary glass mould member, said mould member being adapted to mould a reverse contoured surface on an organic polymer multifocal ophthalmic lens, each contoured surface comprising two surfaces of curvature, each having a different radius of curvature and the edge of one surface of curvature being spaced from the other by a wall, the spacing wall between the two surfaces of curvature being at an angle of 10-15 degrees to a plane normal to the second surface to permit opening of the glass mould member to remove a moulded organic lens without damage to the lens, the improvement comprising pressing a glass segment with a cavity having a base forming a web and a portion of its vertical wall slanting outwardly at an angle of 10-15 degrees to a vertical plane, removing the web to form a perforated segment having a predetermined convex curvature corresponding to the concave curvature of a body to which the perforated segment is to be fusion sealed, placing the perforated segment on the body in a position displaced from the center line of the body, the slanted portion of the perforated segment oriented inwardly toward the center line, fusion sealing the two bodies together to form a fused assembly, and then grinding the fused assembly to a desired major curvature whereby a portion of the slanted portion of the perforated segment wall remains as the separating wall between the two surfaces of curvature on the contoured surface of the primary mould member, thereby permitting the glass mould to be opened to remove a moulded organic lens without damage to the lens.

PRIOR LITERATURE

The following U.S. Pat. Nos. disclose subject matter related to production of ophthalmic lenses:

Hammon No. 2,388,687 discloses forming a carrier portion having a moulded cavity, inserting two segment elements in the cavity, fusing the assembly to form a segment blank, surface finishing the blank for mounting in a countersink on a major lens element.

Lantz et al. No. 2,704,010 discloses inserting and fusing a button in a cavity of a barrier member, the carrier walls being slanted to allow proper grinding and polishing depth to be determined visually during lens finishing.

Newell No. 2,035,827 & Reh No. 2,112,659 disclose forming a composite button wherein a button is inserted and fused in a cavity or perforation in a carrier member while enclosed by refractory material.

Bausch No. 2,059,767 discloses a method in which a glass carrier member is thermally softened, and a button is pressed into the softened glass in a press mould to simultaneously form a cavity and insert a button therein.

Each of these patents is concerned solely with production of glass lenses. Such lenses are not formed in a mould, and do not have contoured surfaces. Thus, they provide no teaching that is relevant to moulding of organic polymer lenses, or to the problems associated with such moulding.

Campbell No. 4,163,541 discloses a mould for casting a resin ophthalmic lens in which a segment of either prismatic optical effect or prism compensating optical effect is provided over a portion of the front optical surface of the lens. The mould is produced by sealing a perforated glass blank centrally in a recess on a second glass blank and then forming a concave surface of curvature in the composite with a portion of the perforation retained to form the prismatic element on a moulded lens.

Rosenbauer No. 3,649,236 discloses methods of manufacturing moulds for casting multifocal plastic ophthalmic lenses wherein the near vision corrections are provided on the convex surface of the plastic lens. In one method, a cavity in the face of the mould is filled with a soluble filler which can be removed to leave the desired reverse of the corrective curvature desired on the lens. In another method, a perforated disc is sealed in a recess on a larger element and the composite finished to provide the reverse of the desired corrective curvature.

In each patent, the concern is with the shape or design of the corrective surface, and straight walled cavities or perforations are employed. Brief Description of the Drawings FIG. 1 is a cross-section view of a mould heretofore employed in producing organic polymer, bifocal lenses.

Description of the Invention

Figure 1:
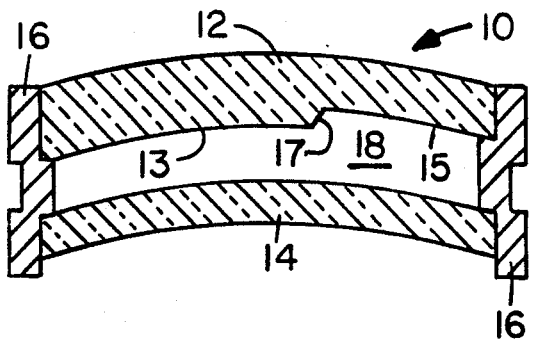

FIG. 1 illustrates the current technique used in casting organic polymer lenses. Mould assembly 10 comprises two glass mould members 12 and 14 shown maintained in spaced relationship by a flexible gasket member 16 surrounding the spaced glass members. This provides a cavity 18 into which a liquid monomer mixture may be cast to cure. Primary mould member 12 is a fused glass body having a contoured inner surface. Mould member 14 has a convex spherical inner surface of curvature that is continuous.

Mould member 12 is adapted to mould a reverse contoured surface on an organic polymer bifocal lens moulded in mould assembly 10. The contoured surface of primary mould member 12 consists of two surfaces of curvature 13 and 15, each having a different radius of curvature. The inner edge of surface 13 is spaced from surface 15 by a narrow wall 17, which is at an angle of 10-15 degrees to a plane normal to surface 15. This slanted wall has traditionally been provided to permit opening of assembly 10 for removal of a moulded organic lens without damage to the lens.

Figure 2:
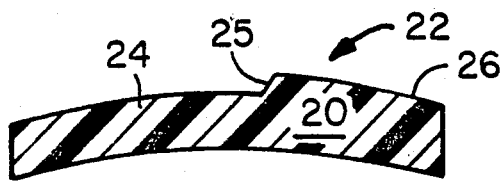
FIG. 2 is a cross-section view of an organic polymer, bifocal lens cast in the mould of FIG. 1.

FIG. 2 shows an organic polymer bifocal lens 20 as produced in assembly 10. The upper surface 22 is made up of a major, or far vision, curvature 24 and a segment, or reading, curvature 26. These surfaces of curvature are imparted by, and hence are the reverse of, surfaces of curvature 13 and 15 formed on the inner face of glass mould member 12. Consequently, surfaces of curvature 24 and 26 have different radii and are spaced by a slanted wall 25 as in primary mould member 12.

Figure 3:
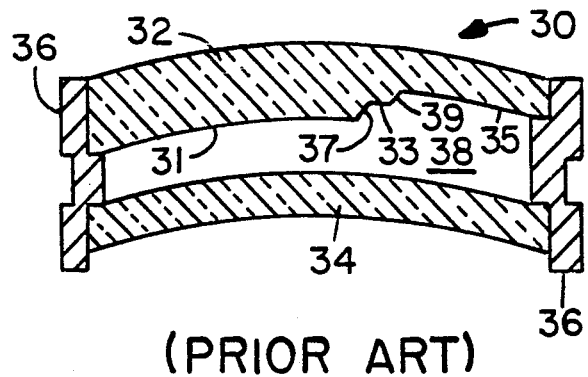
FIG. 3 is a cross-section view of a mould heretofore employed in producing organic polymer, trifocal lenses.

FIG. 3 shows a mould assembly 30 comprising two glass mould members 32 and 34 maintained in spaced relationship by gasket 36 to provide cavity 38. Assembly 30 corresponds to assembly 10 of FIG. 1, except that primary mould member 32 has a surface contour designed for moulding a trifocal lens rather than a bifocal lens. Hence, the contoured surface of primary mould member 32 has three distinct surfaces of curvature 31, 33 and 35, each having a different radius of curvature. As a result, the inner edge of surface 31 is spaced from surface 33 by slanted wall 37, and surfaces 33 and 35 are separated by slanted wall 39.

Figure 4:
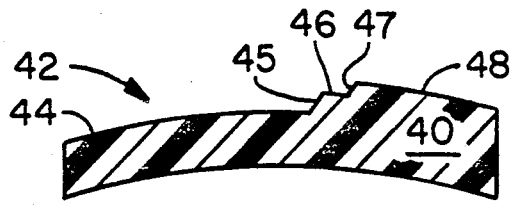
FIG. 4 is a cross-section view of an organic polymer, trifocal lens cast in the mould of FIG. 3.

FIG. 4 shows a trifocal, organic polymer lens 40 produced in the same manner as bifocal lens 20, but having an upper surface 42 composed of a major element surface of curvature 44 and two segment surfaces of curvature 46 and 48. Surfaces of curvature 44, 46 and 48 each has a different radius of curvature. Likewise, surfaces of curvature 44, 46 and 48 are, respectively, spaced apart by slanted walls 45 and 47. It will be appreciated that a suitably contoured upper glass mould member, as shown at 32 in FIG. 3, is required for moulding lens 40.

Figure 5:
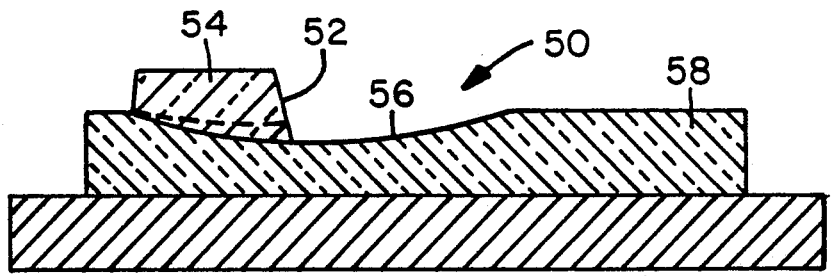
FIG. 5 is a cross-section view of an assembly heretofore employed in producing the primary glass mould element of FIG. 1.

FIG. 5 shows a typical assembly 50 in the production of a fused glass primary mould member, such as shown at 12 in FIG. 1. Initially, an element in the nature of a segment or button is moulded. Then, one flat edge of such element is ground away at an angle of 10–15 degrees, as shown at 52, to permit ultimate release of a cast organic lens. This produces segment element 54 which is mounted for fusion in a depression 56 formed in a glass major element 58. The assembly is now subjected to a heat treatment to fuse segment 54 to major element 58.

It may be noted that the finished surfaces on depression 56 and wall 52 are in the desired final condition at this point. Therefore, this procedure requires that great care be taken to protect those surfaces during further operations.

The fused assembly is then top-side ground and polished to remove sufficient glass to provide a contoured surface that is the precise reverse of that desired on the organic lens to be cast thereagainst.

It will be appreciated the production of a mould segment for a trifocal lens requires that the foregoing process be carried out in duplicate. A major complication involves adequately protecting the initially prepared surfaces while carrying out the second fusion and finishing steps.

My present invention is characterized by a unique method of preparing a glass segment element to be fused in a depression of a major element to form the primary member of a glass mould. Basically, this method involves pressing a segment element having a cavity extending partially through the pressed body from the upper surface. This forms a web portion on the underside of the cavity pressing.

Figure 6:
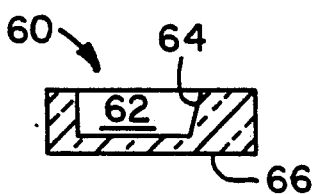
FIG. 6 is a cross-section view of a cavity segment pressing in accordance with the present invention.

FIG. 6 shows, in cross-section, a pressed glass segment 60 adapted to use, in accordance with the invention, in producing a primary mould member for moulding an organic polymer lens. Pressed segment 60 has a cavity 62 moulded therein that extends part way through the segment. A portion of the vertical wall of cavity 62 is slanted outwardly at an angle of 10-15 degrees from a vertical plane as shown by numeral 64. As explained later this facilitates removal of an organic lens from the ultimate mould.

Figure 7:
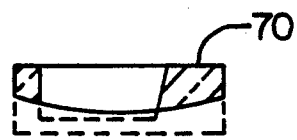
FIG. 7 is a cross-section view of a perforated body prepared from the cavity segment pressing of FIG. 6.

Pressed segment 60 has a web 66 forming the base of cavity 62. Web 66 is removed, as by grinding to a predetermined curvature as shown in FIG. 7. This forms a perforated body 70 adapted to sealing in a depression 84 on a major element 82. Normally, perforated body 70 will have a convex curvature designed to match the concave curvature on depression 84, as shown in FIG. 8.

The web is preferably removed using a full-face, diamond lap of 650-750 mesh for polishing. This avoids damage to the slanted wall portion 64 during the grinding. Otherwise, a protective filler, e.g. an epoxy-metal or a pitch-wax composition, must be used.

Figure 8:
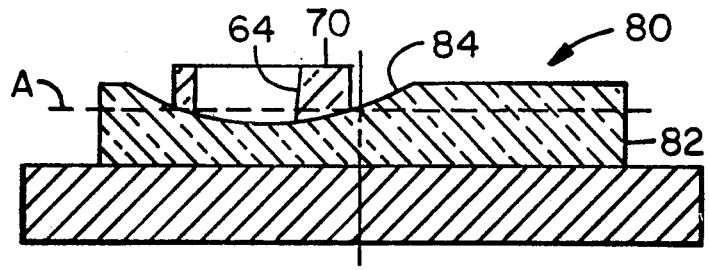
FIG. 8 is a cross-section view of a mould blank assembly in accordance with the invention.

FIG. 8 shows a mould blank assembly 80, in accordance with the invention, preparatory for fusion heat treatment. Major element 82 has depression 84 formed in its upper surface. Perforated body 70, prepared as shown in FIG. 7, is placed in depression 84 with suitable support pins in accordance with glass bifocal fusion practice. Body 70 is so located in depression 84 that it is displaced from the center line of major 82, and has its slanted wall portion 64 oriented inwardly toward the center line.

Following fusion at 710 -725 degrees C, preferably 710-715 degrees C, blank 80 is cooled and the cavity in body 70 is filled with a protective filler. This prepares the blank for top-side grinding to the desired major curve for the distance power curve for a major element as indicated by a dotted line A in FIG. 8. Thereafter, the filler is removed to provide a glass mould member as shown at 12 in FIG. 1.

It will be appreciated that a narrow portion of slanted wall portion 64 remains to form a spacing or separating wall 17 between surfaces of curvature 13 and 15 on the contoured surface of mould member 12 as shown in FIG. 1. The criticality of properly orienting perforated body 70 in depression 84 now becomes apparent. This insures formation of wall 17 with the required slant to facilitate opening of mould 10 after casting a lens such as lens 20 of FIG. 2.

Figure 9A:
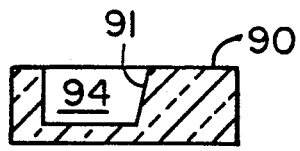
FIGS. 9a & 9b are cross-section views of two cavity segment pressings used in producing a mould for an organic polymer, trifocal lens.
Figure 9B:
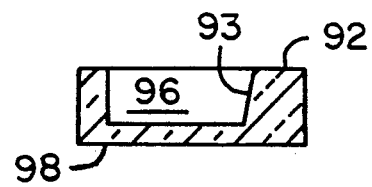

In preparing a primary glass mould member for moulding an organic polymer, trifocal lens, two segment cavity pressings 90 and 92, as shown in FIGS. 9a & 9b, are pressed. These pressings are similar to pressing 60 of FIG. 6 in all respects, except for the size of cavities 94 and 96. In particular, each has a portion of its vertical wall slanted outwardly at an angle of 10-15 degrees from a vertical plane as shown by numerals 91 and 93. It will be observed that the lateral dimension of 94 is somewhat smaller than that of cavity 62, and the lateral dimension of cavity 96 is somewhat larger. The purpose for this will become apparent shortly.

Figure 10A:
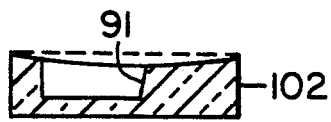
FIGS. 10a & 10b are cross-section views of perforated bodies prepared from the cavity segment pressings of FIGS. 9a & 9b.
Figure 10B:
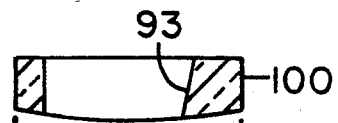
Figure 11:
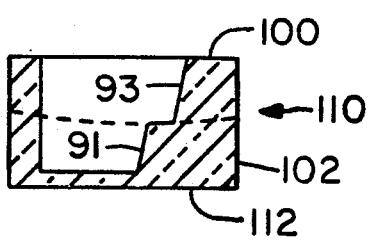
FIG. 11 is a cross-section view of a composite cavity segment prepared from the perforated bodies of FIGS. 10a & 10b.

Pressing 92 has a web portion 98 which is removed to form a perforated body 100, having a convex curvature, as shown in FIG. 10b. This body is similar to perforated body 70 of FIG. 7. However, rather than being sealed in a depression, as in FIG. 8, it is fused to a body 102, as shown in FIG. 10a. Body 102 is prepared from pressed segment 90 by grinding and polishing the upper surface thereof to a concave curvature which is a complement of the convex curvature formed on body 100. Perforated body 100 is mounted atop body 102, and the two bodies fused along their complementary curvatures to form a composite 110, as shown in FIG. 11. It is critical that the slanted wall portions 91 and 93 coincide in forming composite 110.

Figure 12:
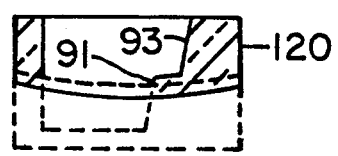
FIG. 12 is a cross-section view of a perforated body prepared from the composite cavity segment of FIG. 11.
Figure 13:
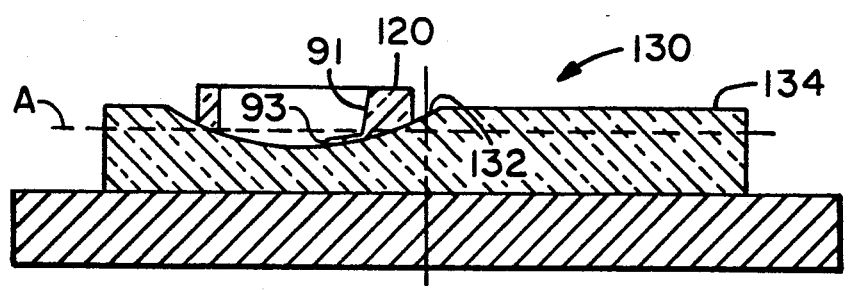
FIG. 13 is a cross-section view of the perforated body of FIG. 12 mounted in a mould blank assembly preparatory to producing a mould for an organic polymer, trifocal lens.

Thereafter, the base of composite 110, including webbed portion 112, is removed to provide a perforated body 120, as shown in FIG. 12. Perforated body 120 is then mounted in depression 132 of major element 134, as shown in assembly 130 of FIG. 13, preparatory to fusion sealing, as described with reference to mould blank assembly 80. As in assembly 80, perforated body 120 should be so located in depression 132 that it is displaced from the center line of major 134 and has the combined slanted wall portions 91 and 93 oriented inwardly toward the center line. The fused assembly is then topside finished to provide a primary glass mould member as shown by numeral 32 in FIG. 3. This finishing leaves narrow portions of slanted walls 91 and 93 forming the spacing or separating walls 37 and 39 on the contoured surface of mould member 32 as shown in FIG. 3. As before, proper orientation of body 120 in assembly 130 insures forming walls 37 and 39 with the required slant to facilitate opening of mould 30 after casting a trifocal organic polymer lens such as lens 40 shown in FIG. 4.

Figure 14:
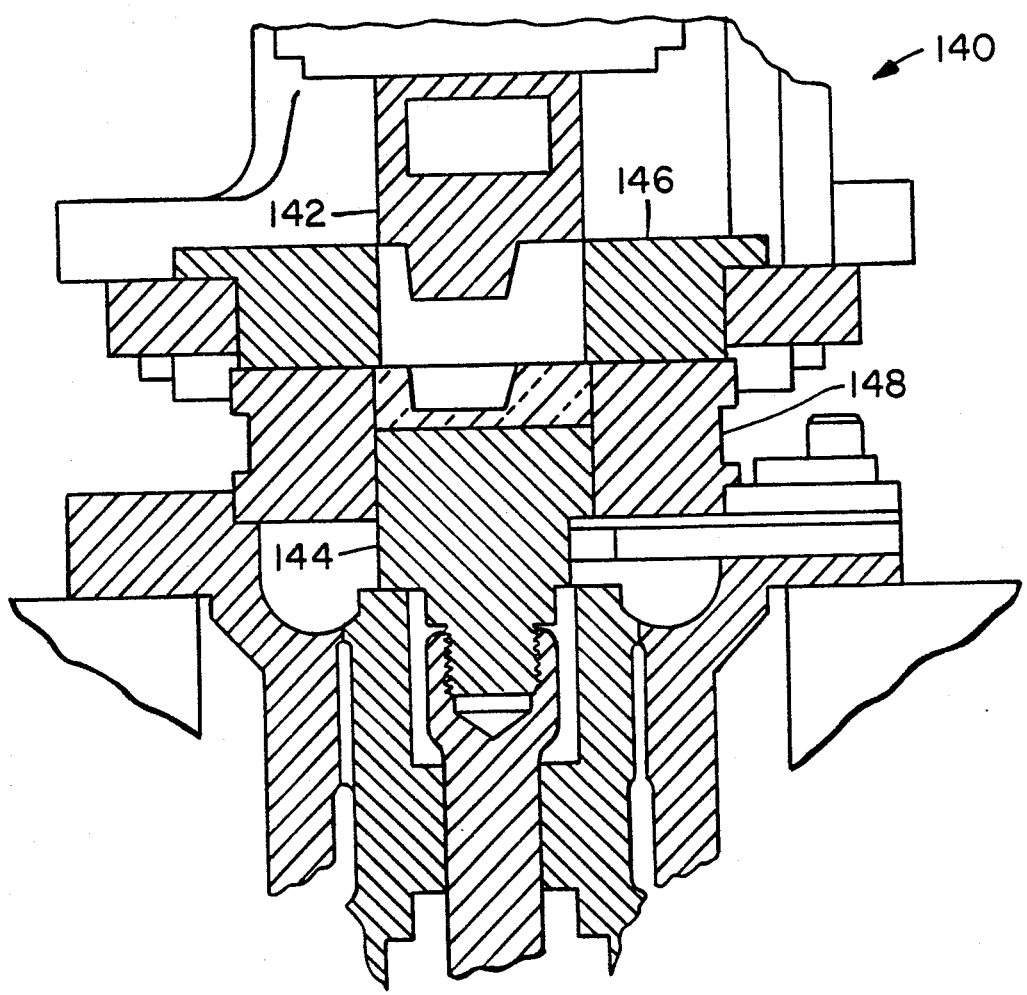
FIG. 14 is a cross-section view of a typical, single mould, glass pressing apparatus suitable for pressing the cavity segments of FIGS. 6, 9a & 9b.

Each of cavity segments 60, 90 and 92 may be pressed from a molten gob of suitable glass in a typical four-piece mould set 140, as illustrated in FIG. 14. Mold set 140 may include a pressing ram 142, a preset valve tool 144 and ring members 146 and 148.

Pressing ram 142 forms a cavity segment, such as segment 60, from a gob of molten glass. It may be formed from a perlitic annealed steel having highly polished surfaces. This imparts correspondingly polished quality to the vertical walls 54 of the cavity such as 62. The cavity walls are required to have a roughness height (RMS) of no more than 10 micro inches, and preferably no more than 5, as measured with a Type FL tracer profilometer. Valve tool 144 may be ductile cast iron, and ring members 146 and 148 may be hardened tool steel.

My invention greatly reduces the degree of skill and care required in production of the primary glass mould member used in moulding organic polymer, multifocal lenses. It is of particular value in trifocal mould production, since formation of the second reading section is a much simpler and less risky procedure than heretofore. Further, the invention permits formation of virtually any reading segment style desired in an organic polymer lens, whereas prior methods were limited to the straight-top or D-style segment. Of particular significance, however, is the provision of a pressed slanted wall, in lieu of a ground and polished wall, to provide a slanted separating wall between the surfaces of curvature on both a primary mould member and an organic polymer multifocal lens cast in a mould with such member.

I claim:

1. In an improved method of forming a contoured surface on a primary glass mould member, said mould member being adapted to mould a reverse contoured surface on an organic polymer multifocal ophthalmic lens, each contoured surface comprising two surfaces of curvature, each having a different radius of curvature and the edge of one surface of curvature being spaced from the other by a wall, the spacing wall between the two surfaces of curvature being at an angle of 10-15 degrees to a plane normal to the second surface to permit opening of the glass mould member to remove a moulded organic lens without damage to the lens, the improvement comprising pressing a glass segment with a cavity having a base forming a web and a portion of its vertical wall slanting outwardly at an angle of 10-15 degrees to a vertical plane, removing the web to form a perforated segment having a predetermined convex curvature corresponding to the concave curvature of a body to which the perforated segment is to be fusion sealed, placing the perforated segment on the body, fusion sealing the two bodies together to form a fused assembly, and then grinding the fused assembly to a desired major curvature whereby a portion of the slanted portion of the perforated segment wall remains as the separating wall between two surfaces of curvature on the contoured surface of he primary mould member, thereby permitting the glass mould to be opened to remove a moulded organic lens without damage to the lens.

2. The method of claim 1 wherein the body on which the perforated segment is placed is a major element having a depression in its face and the perforated segment is placed in the depression in a position displaced from the center line of the major, the slanted portion of the perforated segment wall oriented inwardly toward the center line.

3. The method of claim 1 wherein the body on which the perforated segment is placed is a second pressed glass segment having a smaller pressed cavity and also having a slanted wall portion, the slanted wall portions on the two perforated segments coinciding, the two segments are fusion sealed, the base of the resulting composite is removed to produce a perforated composite having a convex surface of curvature, the composite is placed in a depression on the face of a major element in a position displaced from the center line of the major, the slanted portion of the composite wall being oriented inwardly toward the center line.

4. A method of forming a primary, glass mould member to produce an organic polymer, trifocal lens which comprises pressing two glass segments, each with an open cavity extending upwardly from a web across the bottom of the segment, one of said cavities being larger than the other and each having a portion of its cavity wall slanting outwardly at an angle of 10-15 degrees with the vertical plane, removing the web from one cavity segment in such manner as to provide a perforated segment, the bottom of such segment having a predetermined convex surface of curvature, imparting a concave surface of curvature to the top surface of the segment with the smaller cavity that corresponds to the convex surface of curvature on the segment with the larger cavity, resting the larger perforation segment atop the smaller cavity segment with the slanting wall portions of each coinciding, fusing the two segments to form an integral segment, removing the base of the integral segment to produce a perforated composite having a convex surface of curvature, placing the composite in a depression on the face of a major element in a position displaced from the center line of the major, the slanted portion of the composite wall being oriented inwardly toward the center line, fusing the composite segment in the depression and imparting a desired surface of curvature to the upper surface of the fused body.

* * * * *